(12) United States Patent
Behzad et al.

(10) Patent No.: US 7,634,027 B2
(45) Date of Patent: Dec. 15, 2009

(54) METHOD AND SYSTEM FOR INDEPENDENT I AND Q LOOP AMPLITUDE CONTROL FOR QUADRATURE GENERATORS

(75) Inventors: Arya Behzad, Poway, CA (US); Qiang Li, Irvine, CA (US); Razieh Roufoogaran, Venice, CA (US)

(73) Assignee: Broadcom Corporation, Irvine, CA (US)

( * ) Notice: Subject to any disclaimer, the term of this patent is extended or adjusted under 35 U.S.C. 154(b) by 523 days.

(21) Appl. No.: 11/618,719

(22) Filed: Dec. 29, 2006

(65) Prior Publication Data

US 2008/0137777 A1 Jun. 12, 2008

Related U.S. Application Data

(60) Provisional application No. 60/868,818, filed on Dec. 6, 2006.

(51) Int. Cl.
*H04L 25/06* (2006.01)
(52) U.S. Cl. ........................ 375/319; 375/298; 375/320
(58) Field of Classification Search ........................ None
See application file for complete search history.

(56) References Cited

U.S. PATENT DOCUMENTS 6,941,118 B2 * 9/2005 Yamamoto ................... 455/126
7,421,260 B2 * 9/2008 Darabi ........................ 455/130

* cited by examiner

*Primary Examiner*—An T Luu
(74) *Attorney, Agent, or Firm*—McAndrews, Held & Malloy, Ltd.

(57) ABSTRACT

Certain aspects of a method and system for independent in-phase (I) and quadrature (Q) loop amplitude control for quadrature generators may include determining an amplitude voltage associated with an in-phase (I) component and a quadrature (Q) component of a generated signal. A DC reference voltage associated with the I component and the Q component may be determined. The determined amplitude voltage may be compared with the determined reference voltage to generate a control signal. The amplitude mismatch between the I component and the Q component may be compensated by controlling a biasing current of one or more programmable buffers associated with one or both of the I component and the Q component, based on the generated control signal.

27 Claims, 7 Drawing Sheets

METHOD AND SYSTEM FOR INDEPENDENT I AND Q LOOP AMPLITUDE CONTROL FOR QUADRATURE GENERATORS

CROSS-REFERENCE TO RELATED APPLICATIONS/INCORPORATION BY REFERENCE

This patent application makes reference to, claims priority to and claims benefit from U.S. Provisional Patent Application Ser. No. 60/868,818, filed on Dec. 6, 2006.

This application makes reference to:

U.S. application Ser. No. 11/618,716 filed on even date herewith;

U.S. application Ser. No. 11/618,721 filed on even date herewith;

U.S. application Ser. No. 11/618,863 filed on even date herewith; and

U.S. application Ser. No. 11/618,720 filed on even date herewith.

Each of the above stated applications is hereby incorporated by reference in its entirety.

FIELD OF THE INVENTION

Certain embodiments of the invention relate to communication systems. More specifically, certain embodiments of the invention relate to a method and system for independent in-phase (I) and quadrature (Q) loop amplitude control for quadrature generators.

BACKGROUND OF THE INVENTION

The development and design of radio receivers, transmitter, and/or transceiver systems has been driven by the great demand for devices for mobile wireless communication applications, especially handset devices. With the ever decreasing size of mobile handsets and an ever increasing demand for voice, data, and/or video processing capabilities, there is an growing need to develop radio receivers and transmitters that not only meet these challenging performance requirements, but that do so in smaller integrated circuit (IC) footprints, that is, at lower cost, and with greater power efficiency. One approach that aims at addressing these demands is the development of highly integrated receivers, transmitters, and/or transceivers in complementary metal oxide semiconductor (CMOS) technology to minimize the number of off-chip components.

As a result of these highly integrated systems, radio receivers, transmitters, and/or transceivers may comprise a large number of components and/or circuits, which may be utilized for the processing of signals. The design of optimal systems may require that these components and/or circuits operate within certain requirements or constraints for a wide range of operational conditions. For example, power amplifiers (PA) and/or low noise amplifiers (LNA) may be required to operate at an optimal gain level. However, this gain level may vary significantly based on operational conditions, such as temperature and/or voltage supplies, or based on manufacturing conditions, such as the non-uniformity in transistor parameters that result from normal variations in the manufacturing process. These variations generally referred to as process, voltage, and temperature (PVT) variations, may have a significant effect in the overall performance of wireless handsets.

In systems based on the global system for mobile communications (GSM) standard, for example, PVT variations in many of the circuits and/or components utilized in the receiver or the transmitter may produce errors in the generation of "I" (in-phase) and "Q" (quadrature) signal components. These errors may result in a significant degradation in the signal-to-noise ratio (SNR) and/or the bit-error-rate (BER) performance of GSM handsets.

In-phase (I) and quadrature (Q) signals are typically utilized in modulation and demodulation sections of transceivers in cellular handsets and other types of communication devices. The I and Q signals, which are 90 degrees out of phase, may be generated, for example, by coupling an input local oscillator signal to first and second outputs via different RC networks. For example, one RC network may include a capacitor coupled between the input and the first output and a resistor coupled between the first output and ground and the other RC network may include a capacitor coupled between the input and the second output and a resistor coupled between the second output and ground. To achieve balanced I and Q signals or I and Q signals having the same amplitude, the resistors in each RC network and the capacitors in each RC network must have the same and predetermined value according to the operation frequency. However, process variations, particularly in the resistors, can cause the I and Q signals to significantly differ in amplitude, thereby undesirably affecting transceiver performance.

In one approach, system level calibration can be used to reduce the difference in amplitude between the I and Q signals. However, system level calibration may not be effective in instances where the difference in amplitude of the I and Q signals is too great. In another approach, calibrated resistors may be utilized in the RC networks to achieve I and Q signals having similar amplitudes. However, at high local oscillator frequencies, such as 5.0 GHz, each RC network requires a very small value resistor, which is difficult to calibrate.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for independent in-phase (I) and quadrature (Q) loop amplitude control for quadrature generators, for example, RC-based quadrature generators, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for independent in-phase (I) and quadrature (Q) loop amplitude control for quadrature generators. Aspects of the method and system may comprise determining an amplitude voltage associated with an in-phase (I) component and a quadrature (Q) component of a generated signal. The determined amplitude voltage may be a peak, root mean square (rms) or the average voltage associated with the I component and the Q component. A DC reference voltage associated with the I component and the Q component may be determined. The determined amplitude voltage may be compared with the determined reference voltage to generate a control signal. The amplitude mismatch between the I component and the Q component may be compensated by controlling a biasing current of one or more programmable buffers associated with one or both of the I component and the Q component, based on the generated control signal.

Figure 1:
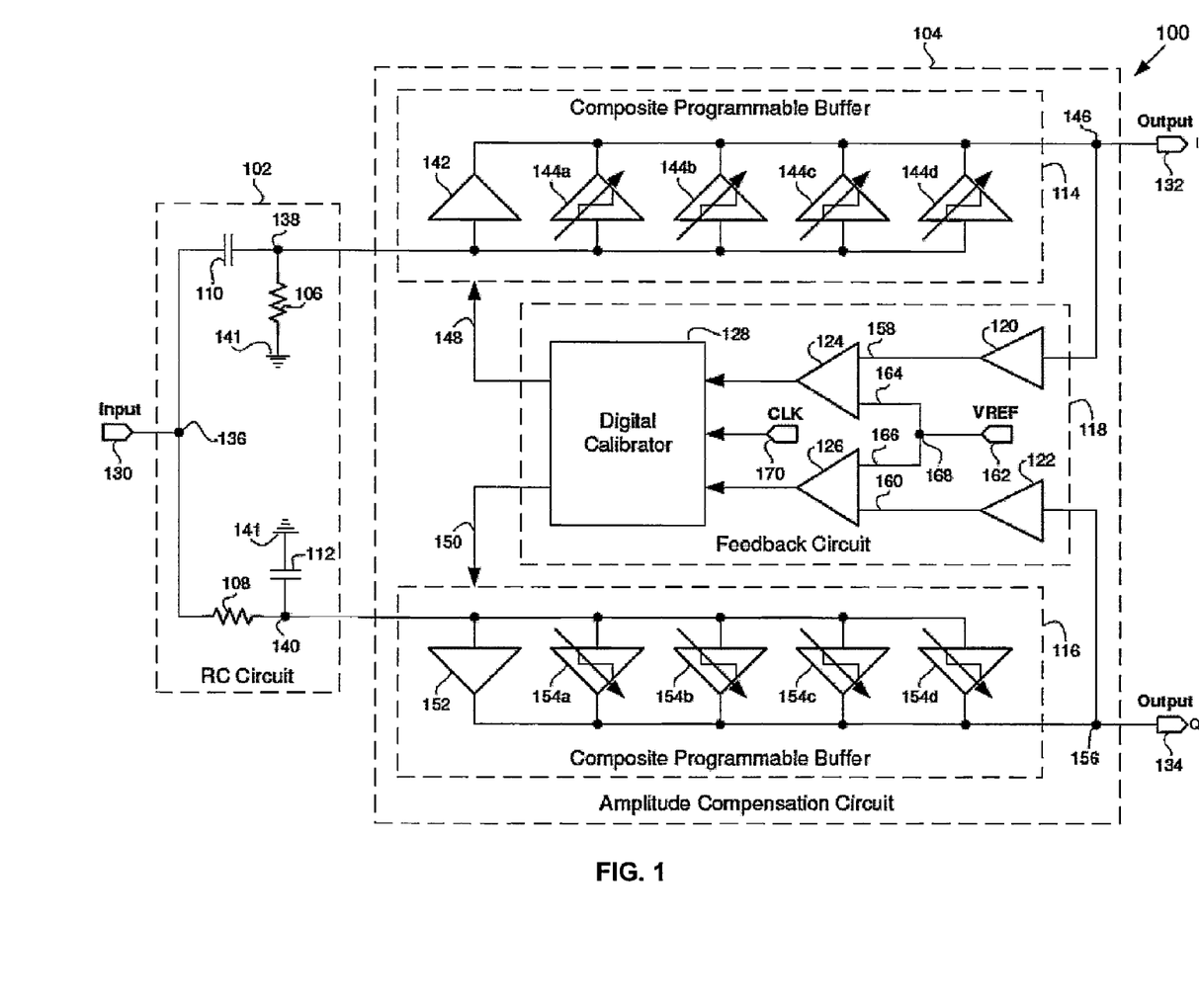
FIG. 1 is a block diagram illustrating an exemplary system for amplitude mismatch compensation, in accordance with an embodiment of the invention.

FIG. 1 is a block diagram illustrating an exemplary system for amplitude mismatch compensation, in accordance with an embodiment of the invention. Referring to FIG. 1, there is shown an exemplary system 100 that comprises a RC circuit 102 and an amplitude compensation circuit 104. The RC circuit 102 comprises a plurality of resistors 106 and 108 and a plurality of capacitors 110 and 112 and a ground (GND) 141. The amplitude compensation circuit 104 may comprise a plurality of composite programmable buffers 114 and 116 and a feedback circuit 118. The feedback circuit 118 may comprise a plurality of amplitude detectors 120 and 122, a plurality of comparators 124 and 126, and a digital calibrator 128. The composite programmable buffers 114 may comprise a constant transconductance (Gm) buffer 142 and a plurality of programmable buffers 144a, 144b, 144c, and 144d. The composite programmable buffers 116 may comprise a constant transconductance (Gm) buffer 152 and a plurality of programmable buffers 154a, 154b, 154c, and 154d. The exemplary system 100 may be utilized in a communication device, such as a cellular handset or other type of wireless or wireline communication device, and may be fabricated on a single semiconductor die.

The input 130 may be coupled to the capacitor 110 and the resistor 108 at node 136. The capacitor 110 and resistor 108 may be coupled to respective nodes 138 and 140. The input 130 may provide a sinusoidal signal, such as an RF sinusoidal signal. In one embodiment of the invention, the input 130 may provide a local oscillator signal. The resistor 106 and capacitor 112 may be coupled to the respective nodes 138 and 140 and ground 141. In the RC circuit 102, the resistors 106 and 108 may be selected to have substantially the same and predetermined value, and the capacitors 110 and 112 may be selected to have substantially the same and predetermined value, according to the operation frequency f, where $f = 1/(2\pi RC)$. The output signals generated by the RC circuit 102 at nodes 138 and 140 may be input into the amplitude compensation circuit 104 and the respective composite programmable buffers 114 and 116 at nodes 138 and 140.

The signals generated by the RC circuit 102 at nodes 138 and 140 may have the same frequency but are out of phase with each other. In one embodiment of the invention, the signals generated by the RC circuit 102 at nodes 138 and 140 may be in-phase (I) and quadrature (Q) signals respectively, where the Q signal is 90 degrees out of phase with the I signal. Ideally, the output signals at nodes 138 and 140 have the same amplitude, i.e. they are balanced signals. However, fabrication process variations may cause the values of resistors 106 and 108 and, to a lesser extent, the values of capacitors 110 and 112 to change. For example, process variations may cause resistors 106 and 108 to vary by about 20.0% or more.

Process variations may cause resistors 106 and 108 to vary in the same direction, i.e. resistors 106 and 108 both either increase or decrease in value. However, when resistors 106 and 108 both increase or both decrease in value, they have opposite effects on the amplitudes of the output signals at respective nodes 138 and 140. As a result of the changes in values of resistors 106 and 108 and capacitors 110 and 112 caused by process variations, the amplitudes of the output signals at nodes 138 and 140 may be significantly different and the output signals at nodes 138 and 140 may have different amplitudes.

The constant transconductance (Gm) buffer 142 and the programmable buffers 144a, 144b, 144c, and 144d in the composite programmable buffer 114 may be coupled in a parallel configuration between node 138 and node 146. The programmable buffer 144a may have a transconductance $Gm_1$, which may be selected to provide a desired incremental change of transconductance in the composite programmable buffer 114. For example, $Gm_1$ may have a value of 3.0 milisiemens (mS). In an exemplary embodiment of the invention, the programmable buffer 144b may have a transconductance $Gm_2$" that may be equal to $2.0*Gm_1$, for example. The programmable buffer 144c may have a transconductance $Gm_3$ that may be equal to $4.0*Gm_1$, for example. The programmable buffer 144d may have a transconductance $Gm_4$ that may be equal to $8.0*Gm_1$, for example.

The plurality of programmable buffers 144a, 144b, 144c, and 144d may each be independently programmed by the control signal 148 to be either ON or OFF. In an exemplary embodiment of the invention, the control signal 148 generated by the digital calibrator 128 may be a 4-bit control signal, for example, where each bit of the control signal 148 may control one of the programmable buffers 144a, 144b, 144c, and 144d. The control signal 148 may enable any combination of the programmable buffers to be either ON or OFF. In other embodiments of the invention, the control signal 148 may comprise more or less than four bits. The constant Gm buffer 142 may be always turned ON and may have a transconductance $Gm_{constant}$ that determines the minimum transconductance of the composite programmable buffer 114. For example, if the programmable buffers 144a, 144b, 144c, and 144d are turned OFF via the control signal 148, the transconductance of the composite programmable buffer 114 may be equal to $Gm_{constant}$. The $Gm_{constant}$ may be selected to ensure that the composite programmable buffer 114 may generate an output signal having at least a minimum required amplitude at its output.

The constant Gm buffer 152 and the plurality of programmable buffers 154a, 154b, 154c, and 154d in the composite programmable buffer 116 may be coupled in a parallel configuration between node 140 and node 156. The constant Gm buffer 152 and the plurality of programmable buffers 154a, 154b, 154c, and 154d may have substantially the same transconductance as the constant Gm buffer 142 and the plurality of programmable buffers 144a, 144b, 144c, and 144d, respectively. The constant Gm buffer 152 and the programmable buffers 154a, 154b, 154c, and 154d may have transconductances $Gm_{constant}$, $Gm_1$, $Gm_2$, $Gm_3$, and $Gm_4$ respectively. The transconductance of constant Gm buffer 152 may be equal to $Gm_{constant}$ and may determine the minimum transconductance of the composite programmable buffer 116.

The plurality of programmable buffers 154a, 154b, 154c, and 154d may each be independently programmed by the control signal 150 to be either ON or OFF. In an exemplary embodiment of the invention, the control signal 150 generated by the digital calibrator 128 may be a 4-bit control signal, where each bit of the control signal 150 may be enabled to control one of the programmable buffers 154a, 154b, 154c, and 154d. In other embodiments of the invention, the control signal 150 may have more or less than four bits. The programmable buffers in the composite programmable buffers 114 and 116 may be similarly controlled by respective control signals 148 and 150.

The inputs of amplitude detectors 120 and 122 may be coupled to the respective nodes 146 and 156 and the outputs of the detectors 120 and 122 may be coupled to the respective inputs 158 and 160 of the comparators 124 and 126 respectively. The amplitude detector 120 may be configured to detect an amplitude of the signal at node 146 or output 132 and generate the detected amplitude of output 132 to the comparator 124. The amplitude detector 122 may be configured to detect an amplitude of the signal at node 156 or output 134 and generate the detected amplitude of output 134 to the comparator 126. The reference voltage (VREF) 162 may be coupled to the inputs 164 and 166 of the comparators 124 and 126 respectively at node 168 and the outputs of comparators 124 and 126 may be coupled to the respective inputs of the digital calibrator 128. The comparator 124 may be configured to generate an output corresponding to the difference between the detected amplitude of output 132 and VREF 162. The comparator 126 may be configured to generate an output corresponding to the difference between the detected amplitude of output 134 and VREF 162.

The clock (CLK) 170 may be coupled to an input of digital calibrator 128 and the control signals 148 and 150 may be generated by the digital calibrator 128 and coupled to the composite programmable buffers 114 and 116 respectively. The digital calibrator 128 may be configured to adjust the value of control signal 148 in response to the difference between the detected amplitude of output 132 and VREF 162. The digital calibrator 128 may be configured to adjust the value of control signal 150 in response to the difference between the detected amplitude of output 134 and VREF 162. The digital calibrator 128 may also be configured to store previous values of control signals 148 and 150.

The amplitude compensation circuit 104 may be enabled to receive the input signals having the same frequency from the RC circuit 102 at respective nodes 138 and 140, where the input signal may be out of phase and have different amplitudes. The input signals at nodes 138 and 140 may be amplified by the composite programmable buffers 114 and 116, which generate outputs 132 and 134, respectively. The amplitudes of outputs 132 and 134 may be detected by the feedback circuit 118 and compared to VREF 162.

The feedback circuit 118 may determine the required digital values of control signals 148 and 150 to appropriately adjust the gains of respective composite programmable buffers 114 and 116 so as to substantially reduce the amplitude mismatch of outputs 132 and 134 and VREF 162. The process of adjusting the respective gains of composite programmable buffers 114 and 116 in response to comparisons between the detected amplitudes of respective outputs 132 and 134 and VREF 162 may be performed for an appropriate number of iterations so as to reduce the difference between the amplitudes of outputs 132 and 134.

After each iteration, the previous values of control signals 148 and 150 may be stored by the digital calibrator 128 and new values may be determined for the control signals 148 and 150. The new values of control signals 148 and 150 may then be utilized to further adjust the gains of respective composite programmable buffers 114 and 116 so as to further reduce the difference between the amplitudes of outputs 132 and 134. In one embodiment of the invention, the difference between the amplitudes of outputs 132 and 134 may be sufficiently reduced so that the amplitudes of outputs 132 and 134 may be substantially equal.

Figure 2:
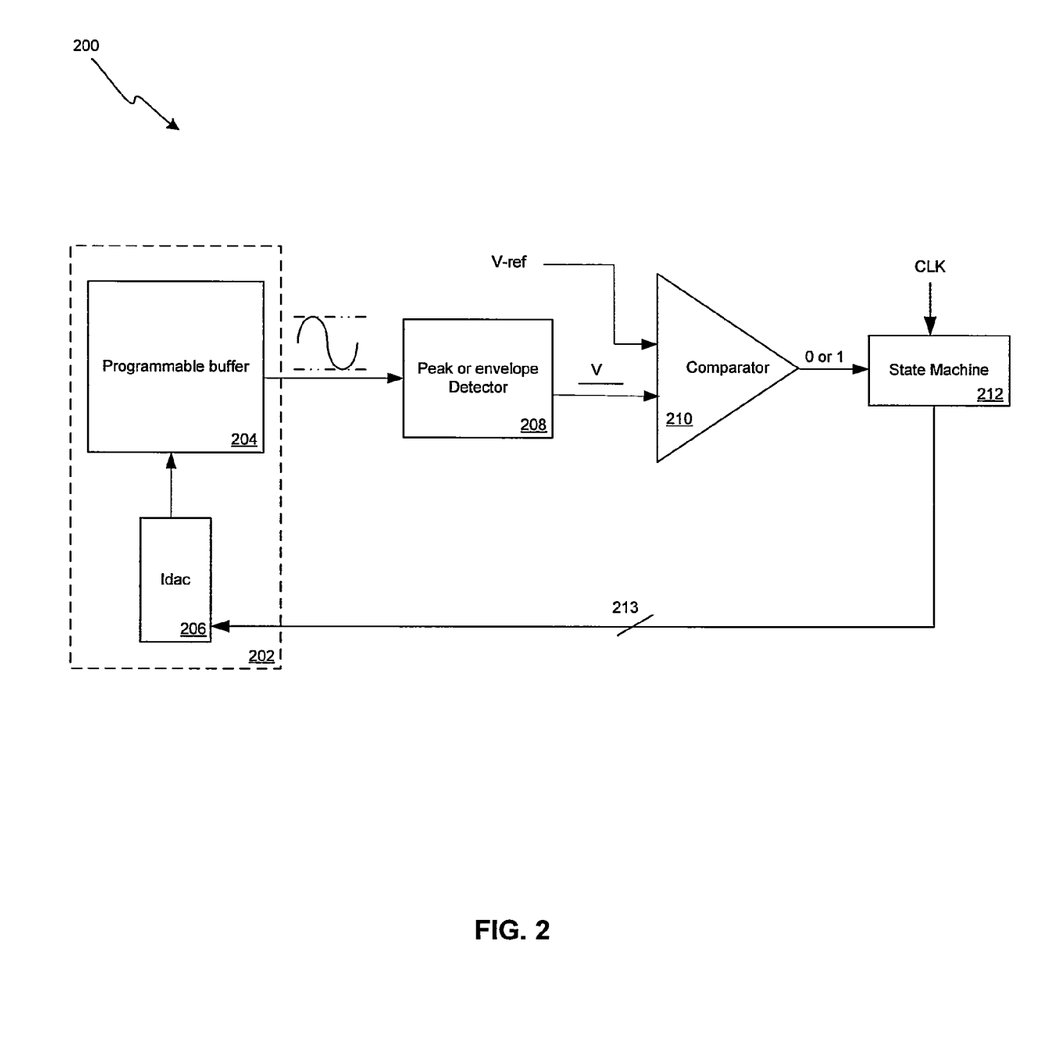
FIG. 2 is a block diagram illustrating an exemplary system for amplitude loop control, in accordance with an embodiment of the invention.

FIG. 2 is a block diagram illustrating an exemplary system for amplitude loop control, in accordance with an embodiment of the invention. Referring to FIG. 2, there is shown an exemplary system 200 that comprises a composite programmable buffer 202, a peak or envelope detector 208, a comparator 210, and a state machine 212. The composite programmable buffer 202 may comprise at least one programmable buffer 204 and a programmable current source Idac 206.

The composite programmable buffer 202 may be substantially similar to the composite programmable buffer 114 or 116 as described in FIG. 1. The programmable buffer 204 may be substantially similar to any of the programmable buffers 144a, 144b, 144c, 144d, 154a, 154b, 154c, and 154d as described in FIG. 1. The peak or envelope detector 208 may comprise suitable logic, circuitry, and/or code that may be enabled to determine the peak, rms, or average amplitude of the I component and/or the Q component of the output signal and generate a corresponding analog voltage to the comparator 210.

The comparator 210 may comprise suitable logic, circuitry, and/or code that may be enabled to receive a reference voltage, VREF, and the corresponding analog voltage of the peak, rms, or average amplitude of the I component and/or the Q component of the output signal from the peak or envelope detector 208. The comparator 210 may be enabled to compare the received corresponding analog voltage of the peak, rms, or average amplitude of the I component and/or the Q component of the output signal from the peak or envelope detector 208 with the reference voltage, VREF, and generate a digital output signal to the state machine 212.

The state machine 212 may comprise suitable logic, circuitry, and/or code that may be enabled to receive a digital signal from the comparator 210 and generate a digital control signal 213 to the programmable current source Idac 206 to adjust the biasing current in the programmable buffer 204. The state machine 212 may receive timing information from a clock. In an exemplary embodiment of the invention, the state machine 212 may be enabled to communicate the digital control signal 213 to the current source Idac 206 one bit at a time, for example. Each bit of the digital control signal 213 may be enabled to control the biasing current in a programmable buffer within the composite programmable buffer 202.

Figure 3:
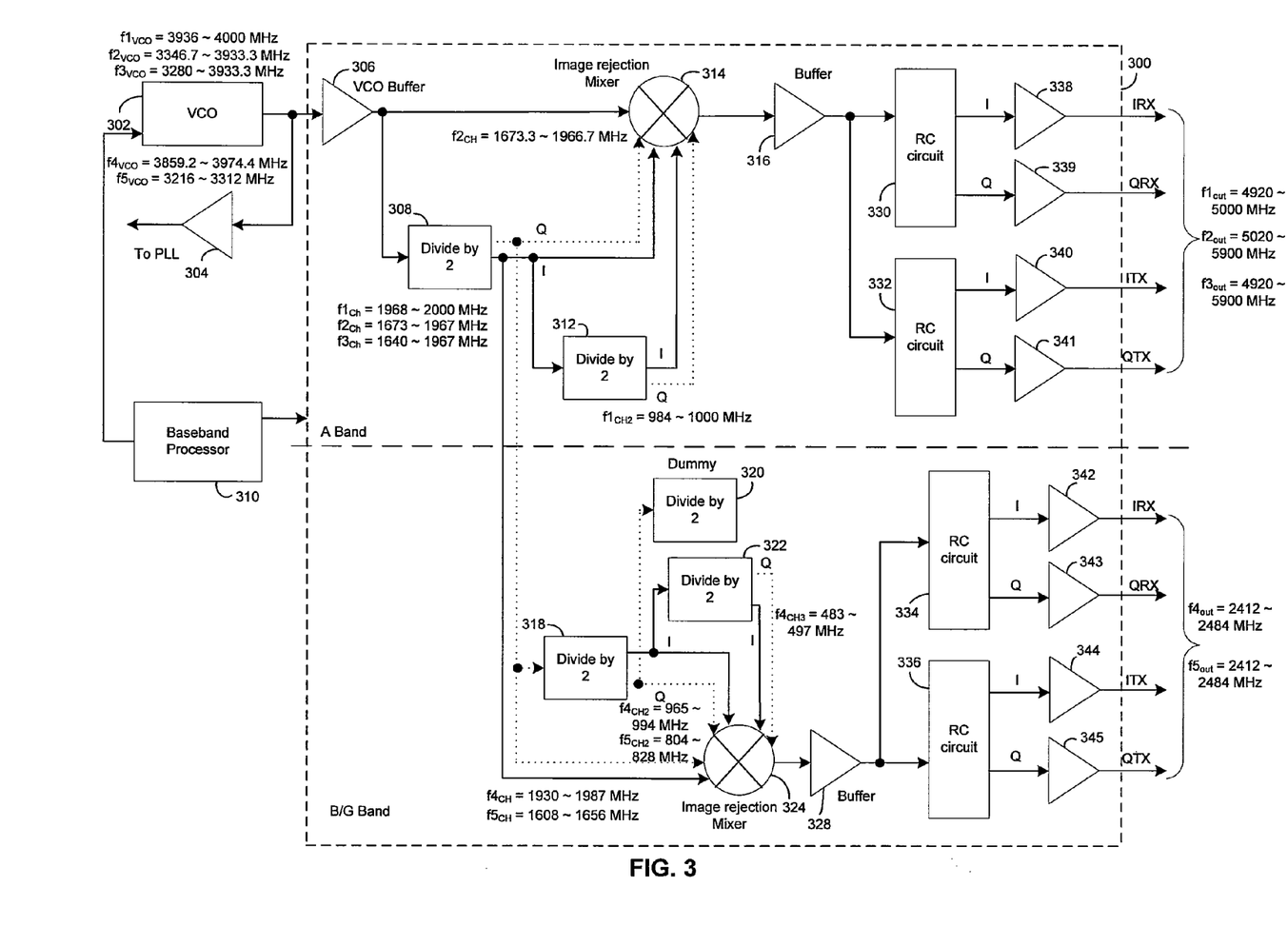
FIG. 3 is a block diagram of an exemplary local oscillator generator architecture for multi-standard wireless communication systems, in accordance with an embodiment of the invention.

FIG. 3 is a block diagram of an exemplary local oscillator generator architecture for multi-standard wireless communication systems, in accordance with an embodiment of the invention. Referring to FIG. 3, there is shown a VCO 302, a buffer 304, a processor 310, and a LO generator 300. The LO generator 300 may comprise a VCO buffer 306, a plurality of image rejection mixers 314 and 324, a plurality of divide by 2 circuits 308, 312, 318, 320, and 322, a plurality of buffers 316 and 328, a plurality of RC circuits 330, 332, 334, and 336, and a plurality of last stage buffers 338, 339, 340, 341, 342, 343, 344, and 345.

The VCO 302 may comprise suitable logic, circuitry, and/or code that may be enabled to generate an output frequency that may be a multiple of the frequency of a reference oscillator. The VCO 302 may be enabled to operate in a plurality of frequency ranges. For example, the VCO 302 may be enabled to operate in a first frequency range, $f1_{VCO}$ of about 3936 MHz to 4000 MHz in divide by 4 mode to generate an output frequency range $f1_{out}$ of about 4920 MHz to 5000 MHz, where $f1_{out}=f1_{VCO}\times 5/4$, for example, a second frequency range, $f2_{VCO}$ of about 3346.7 MHz to 3933.3 MHz in divide by 2 mode to generate an output frequency range $f2_{out}$ of about 5020 MHz to 5900 MHz, where $f2_{out}=f2_{VCO}\times 3/2$, for example, and a third frequency range, $f3_{VCO}$ of about 3280 MHz to 3933.3 MHz in divide by 2 mode to generate an output frequency range $f3_{out}$ of about 4920 MHz to 5900 MHz, where $f3_{out}=f3_{VCO}\times 3/2$, for example, for 802.11a band WLAN operation. The VCO 302 may be enabled to operate in a fourth frequency range, $f4_{VCO}$ of about 3859.2 MHz to 3974.4 MHz in divide by 8 mode to generate an output frequency range $f4_{out}$ of about 2412 MHz to 2484 MHz, where $f4_{out}=f4_{VCO}\times 5/8$, for example, and a fifth frequency range, $f5_{VCO}$ of about 3216 MHz to 3312 MHz in divide by 4 mode to generate an output frequency range $f5_{out}$ of about 2412 MHz to 2484 MHz, where $f5_{out}=f5_{VCO}\times 3/4$, for example, for 802.11b/g band WLAN operation. The buffer 304 may be enabled to receive a signal from the VCO 302 and generate an output to a PLL in the same frequency range as VCO 302.

The baseband processor 310 may comprise suitable logic, circuitry, and/or code that may be enabled to select LO generator 300 divider configurations depending on a required output frequency range and an input frequency range of operation at VCO 302 based on a particular wireless band of operation, for example, 802.11a/b/g wireless band of operation. The VCO buffer 306 may comprise suitable logic, circuitry, and/or code that may be enabled to buffer and/or store the received signals from the VCO 302. The plurality of divide by 2 circuits 308, 312, 318, 320, and 322 may comprise suitable logic, circuitry, and/or code that may be enabled to generate the in-phase (I) and quadrature (Q) components of a received signal, and may output the generated I and Q components to a plurality of mixers.

The divide by 2 circuit 308 may be enabled to divide the frequency of the received input signal from the VCO 302 and generate an output signal with half the frequency of the received input signal. For example, the divide by 2 circuit 308 may generate I and Q components of an output signal in the frequency range, $f1_{CH}$ of about 1968 MHz to 2000 MHz, for example, for 802.11a band WLAN operation in divide by 4 mode and VCO range of $f1_{VCO}$. The divide by 2 circuit 308 may generate I and Q components of an output signal in the frequency range, $f2_{CH}$ of about 1673 MHz to 1967 MHz, for example, for 802.11a band WLAN operation in divide by 2 mode and VCO range of $f2_{VCO}$. The divide by 2 circuit 308 may generate I and Q components of an output signal in the frequency range, $f3_{CH}$ of about 1640 MHz to 1967 MHz, for example, for 802.11a band WLAN operation in divide by 2 mode and VCO range of $f3_{VCO}$. The divide by 2 circuit 308 may generate I and Q components of an output signal in the frequency range, $f4_{CH}$ of about 1930 MHz to 1987 MHz, for example, for 802.11b/g band WLAN operation in divide by 8 mode and VCO range of $f4_{VCO}$. The divide by 2 circuit 308 may generate I and Q components of an output signal in the frequency range, $f5_{CH}$ of about 1608 MHz to 1656 MHz, for example, for 802.11b/g band WLAN operation in divide by 4 mode and VCO range of $f5_{VCO}$.

The divide by 2 circuit 312 may be enabled to divide the frequency of the received I component of the output signal from the divide by 2 circuit 308 and generate an output signal with half the frequency of the received input signal. For example, the divide by 2 circuit 312 may generate I and Q components of an output signal in the frequency range, $f1_{CH2}$ of about 984 MHz to 1000 MHz, for example, for 802.11a band WLAN operation in divide by 4 mode and VCO range of $f1_{VCO}$.

The divide by 2 circuit 318 may be enabled to divide the frequency of the received Q component of the output signal from the divide by 2 circuit 308 and generate an output signal with half the frequency of the received input signal for 802.11b/g band WLAN operation. The divide by 2 circuit 318 may generate I and Q components of an output signal in the frequency range, $f4_{CH2}$ of about 965 MHz to 994 MHz, for example, in divide by 8 mode and VCO range of $f4_{VCO}$. The divide by 2 circuit 318 may generate I and Q components of an output signal in the frequency range, $f5_{CH2}$ of about 804 MHz to 828 MHz, for example, in divide by 4 mode and VCO range of $f5_{VCO}$. The divide by 2 circuit 322 may be enabled to divide the frequency of the received I component of the output signal from the divide by 2 circuit 318 and generate an output signal with half the frequency of the received input signal for 802.11b/g band WLAN operation. For example, the divide by 2 circuit 322 may generate I and Q components of an output signal in the frequency range, $f4_{CH3}$ of about 482 MHz to 497 MHz, for example for 802.11b/g band WLAN operation in divide by 8 mode and VCO range of $f4_{VCO}$.

The divide by 2 circuit 320 may be a dummy circuit and may be enabled to receive the Q component of the output signal from the divide by 2 circuit 318. The Q component generated by the divide-by-two circuit 318 may be coupled to the dummy load or divide by 2 circuit 320 with negligible power consumption. This results in symmetric loading of the divide-by-two circuit 318 and perfect I-Q matching. The dummy load may comprise a load that is equivalent to the divide by 2 circuit 322.

The divide by 2 circuit 308 may be symmetrically loaded. For example, the I component of the divide by 2 circuit 308 may be coupled to a divide by 2 circuit 312 and the plurality of image rejection mixers 314 and 324. Similarly, the Q component of the divide by 2 circuit 308 may be coupled to a divide by 2 circuit 318 and the plurality of image rejection mixers 314 and 324.

The image rejection mixer 314 may comprise suitable logic, circuitry, and/or code that may be enabled to mix the frequencies of the received signals from the VCO 302 and at least one of the plurality of divide by 2 circuits 308 and 312 to generate an output signal to the buffer 316. The image rejection mixer 314 may be enabled to suppress unwanted images of frequencies by processing the received signal and image differently. The image rejection mixer 314 may be enabled to receive the I and Q components of the output signals generated by the plurality of divide by 2 circuits 308 and 312. The image rejection mixer 314 may be enabled to generate an output signal for the particular wireless band of operation based on mixing a plurality of received signals within a selected frequency range. The buffer 316 may be enabled to generate a buffered output of the received signal from the image rejection mixer 314 to the plurality of RC circuits 330 and 332. The baseband processor 310 may be enabled to select at least one of the plurality of signals received from the plurality of divide by 2 circuits 308 and 312. For example, the image rejection mixer 314 may be enabled to mix the frequency of the received signal from the VCO buffer 306, and one of the frequencies of the I and Q components of the received signal from the divide by 2 circuit 308, and the frequency of the I and Q components of the received signal from the divide by 2 circuit 312 to generate an output signal to the buffer 316.

The image rejection mixer 324 may comprise suitable logic, circuitry, and/or code that may be enabled to mix the frequencies of the received signals from the divide by 2 circuit 308 and at least one of the plurality of divide by 2 circuits 318 and 322 to generate an output signal to the buffer 328. The image rejection mixer 324 may be enabled to suppress unwanted images of frequencies by processing the received signal and image differently. The image rejection mixer 324 may be enabled to receive the I and Q components of the output signals generated by the plurality of divide by 2 circuits 308, 318, and 322. The image rejection mixer 324 may be enabled to generate an output signal for the particular wireless band of operation based on mixing a plurality of received signals within a selected frequency range. The buffer 328 may be enabled to generate a buffered output of the received signal from the image rejection mixer 324 to the plurality of RC circuits 334 and 336. The baseband processor 310 may be enabled to select at least one of the plurality of signals received from the plurality of divide by 2 circuits 318 and 322. For example, the image rejection mixer 324 may be enabled to mix the frequency of the I and Q components of the received signal from the divide by 2 circuit 308, and one of the frequencies of the I and Q components of the received signal from the divide by 2 circuit 318 and the frequency of the I and Q components of the received signal from the divide by 2 circuit 322 to generate an output signal to the buffer 328.

The plurality of RC circuits 330 and 332 may comprise suitable logic, circuitry, and/or code that may be enabled to generate I and Q components of a received signal to the plurality of last stage buffers 338, 339, 340, and 341 by shifting the phase of the received signal from the buffer 316. The plurality of last stage buffers 338, 339, 340, and 341 may be enabled to amplify signals and generate an output to a transmitter/receiver for 802.11a band WLAN operation. The I and Q components of the output signal generated by the plurality of last stage buffers 338, 339, 340 and 341 may be in the frequency range, $f1_{out}$ of about 4920 MHz to 5000 MHz, for example, for 802.11a band WLAN operation in divide by 4 mode and VCO range of $f1_{VCO}$. The I and Q components of the output signal generated by the plurality of last stage buffers 338, 339, 340 and 341 may be in the frequency range, $f2_{out}$ of about 5020 MHz to 5900 MHz, for example, for 802.11a band WLAN operation in divide by 2 mode and VCO range of $f2_{VCO}$. The I and Q components of the output signal generated by the plurality of last stage buffers 338, 339, 340 and 341 may be in the frequency range, $f3_{out}$ of about 4920 MHz to 5900 MHz, for example, for 802.11a band WLAN operation in divide by 2 mode and VCO range of $f3_{VCO}$.

The plurality of RC circuits 334 and 336 may comprise suitable logic, circuitry, and/or code that may be enabled to generate I and Q components of a received signal to the plurality of last stage buffers 342, 343, 344, and 345 by shifting the phase of the received signal from the buffer 328. The plurality of last stage buffers 342, 343, 344, and 345 may be enabled to amplify signals and generate an output to a transmitter/receiver for 802.11b/g band WLAN operation. The I and Q components of the output signal generated by the plurality of last stage buffers 342, 343, 344 and 345 may be in the frequency range, $f4_{out}$ of about 2412 MHz to 2484 MHz, for example, for 802.11b/g band WLAN operation in divide by 8 mode and VCO range of $f4_{VCO}$. The I and Q components of the output signal generated by the plurality of last stage buffers 341, 343, 344, and 345 may be in the frequency range, $f5_{out}$ of about 2412 MHz to 2484 MHz, for example, for 802.11b/g band WLAN operation in divide by 4 mode and VCO range of $f5_{VCO}$.

In a chip handling both WLAN connection and Bluetooth connection, the baseband processor 310 may avoid pulling of the VCO 302 by the second harmonics generated by the VCO 202 by selecting an input frequency range of operation at VCO 302 based on a particular wireless band of operation, for example, 802.11a/b/g wireless band of operation. Similarly, the I and Q components of an output signal generated by the divide by 2 circuit 308 in the frequency range of about 1673.3 MHz to 1966.7 MHz, for example, may not interfere with frequencies of the generated signals of the VCO 202 operating in a Bluetooth mode of operation.

Figure 4:
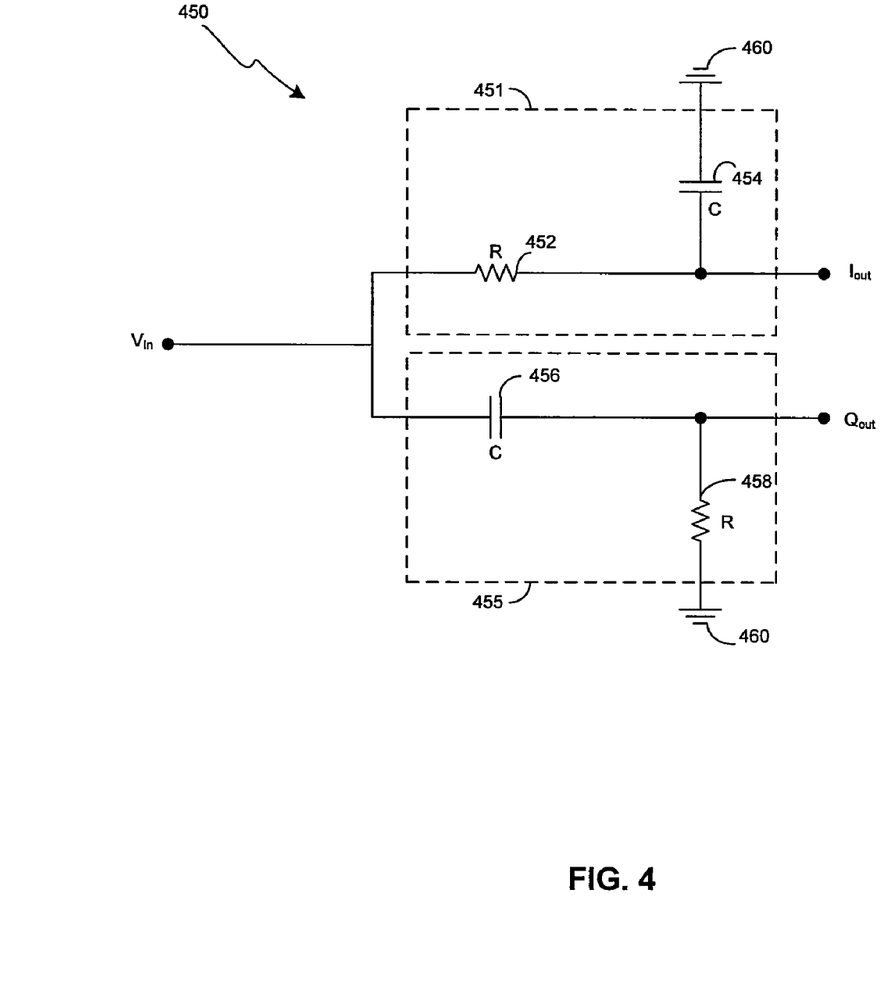
FIG. 4 is a block diagram of an exemplary RC-CR quadrature network that may be utilized in connection with an embodiment of the invention.

FIG. 4 is a block diagram of an exemplary RC-CR quadrature network that may be utilized in connection with an embodiment of the invention. Referring to FIG. 4, there is shown a RC-CR quadrature network 450 that comprises a RC circuit 451 and a CR circuit 455 and a ground (GND) 460. The RC circuit 451 may comprise a resistor R 452 and a capacitor C 454. The CR circuit 455 may comprise a resistor R 458 and a capacitor C 456.

The input $V_{in}$ may be a sinusoidal input signal with frequency ω. The RC circuit 451 comprising R 452 and C 454 may be enabled to generate a phase shifted output $I_{out}$ with amplitude equal to $\pi/2 - \tan^{-1}(RC\omega)$. The CR circuit 455 comprising R 458 and C 456 may be enabled to generate a phase shifted output $Q_{out}$ with amplitude equal to $-\tan^{-1}(RC\omega)$. $I_{out}$ and $Q_{out}$ have a 90 degree phase difference at all frequencies. The amplitude of the output signals, $I_{out}$ and $Q_{out}$ may be equal at $\omega=1/(RC)$. The RC-CR quadrature network 450 may be utilized to generate the I and Q components of the received signal $V_{in}$.

Figure 5A:
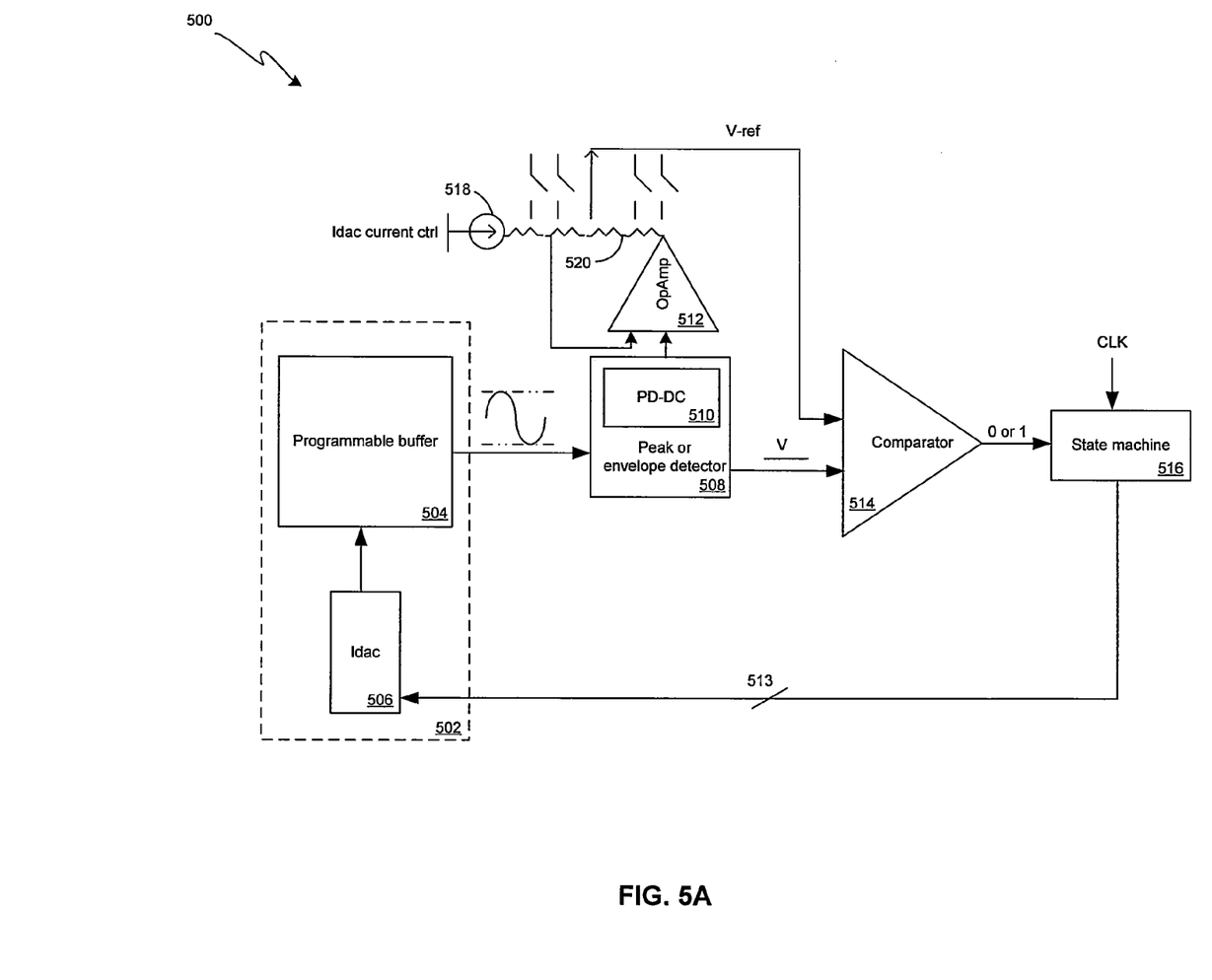
FIG. 5A is a block diagram of an exemplary system for individual I and Q loop amplitude control for quadrature generators, in accordance with an embodiment of the invention.

FIG. 5A is a block diagram of an exemplary system for individual I and Q loop amplitude control for quadrature generators, in accordance with an embodiment of the invention. Referring to FIG. 5A, there is shown an exemplary system 500 that comprises a composite programmable buffer 502, a peak or envelope detector 508, an operational amplifier (op-amp) 512, a current source 518, a variable resistor 520, a comparator 514, and a state machine 516. The composite programmable buffer 502 may comprise at least one programmable buffer 504 and a programmable current source Idac 506. The peak or envelope detector 508 may comprise a DC peak or envelope detector 510.

The composite programmable buffer 502 may be substantially similar to the composite programmable buffer 114 or 116 as described in FIG. 1. The programmable buffer 504 may be substantially similar to any of the programmable buffers 144a, 144b, 144c, 144d, 154a, 154b, 154c, and 154d as described in FIG. 1. The peak or envelope detector 508 may comprise suitable logic, circuitry, and/or code that may be enabled to determine the peak, rms, or average amplitude of the I component and/or the Q component and generate a corresponding analog voltage to the comparator 514. In another embodiment of the invention, the root mean square (rms) voltage or the average voltage associated with the I component and/or the Q component may be determined. The DC peak or envelope detector 510 may comprise suitable logic, circuitry, and/or code that may be enabled to determine the DC reference voltage associated with the I component and/or the Q component and generate an output voltage to the op-amp 512. The peak or envelope detector 508 may be enabled to generate a first input signal to the comparator 514 that may be equal to the sum of the DC reference voltage associated with the I component and/or the Q component and the peak, rms, or average amplitude of the I component and/or the Q component.

The op-amp 512 may comprise suitable logic, circuitry, and/or code that may be enabled to receive the DC reference voltage associated with the I component and/or the Q component and generate an output signal. A reference voltage (VREF) may be determined based on the desired output voltage level of the I component and the Q component. The current source 518 and the variable resistor 520 may be enabled to generate a voltage drop based on the desired amplitude for the I component and the Q component. The op-amp 512 may be enabled to receive the voltage drop generated by the current source 518 and the variable resistor 520. The op-amp 512 may be enabled to generate the reference voltage (VREF) according to the following equation:

$$VREF = (I*R) + PD\_DC$$

where PD_DC is the output of the op-amp 512 and may be equal to the DC reference voltage associated with the I component and/or the Q component, I is equal to the current generated by the current source 518, and R is equal to the resistance of the variable resistor 520. The reference voltage (VREF) may be input to the comparator 514 as a second input signal.

The comparator 514 may comprise suitable logic, circuitry, and/or code that may be enabled to receive a first input signal equal to the sum of the DC reference voltage associated with the I component and/or the Q component and the peak, rms, or average amplitude of the I component and/or the Q component. The comparator 514 may be enabled to receive a second input signal equal to the reference voltage (VREF). The comparator 514 may be enabled to compare the received first input signal and the second input signal and generate a digital signal to the state machine 516.

The state machine 516 may comprise suitable logic, circuitry, and/or code that may be enabled to receive a digital signal from the comparator 514 and generate a digital control signal 513 to the programmable current source Idac 506 to adjust the biasing current in the programmable buffer 504. The state machine 516 may receive timing information from a clock. In an exemplary embodiment of the invention, the state machine 516 may be enabled to communicate the digital control signal 513 to the current source Idac 506 one bit at a time, for example. Each bit of the digital control signal 513 may be enabled to control the biasing current in a programmable buffer within the composite programmable buffer 502.

Figure 5B:
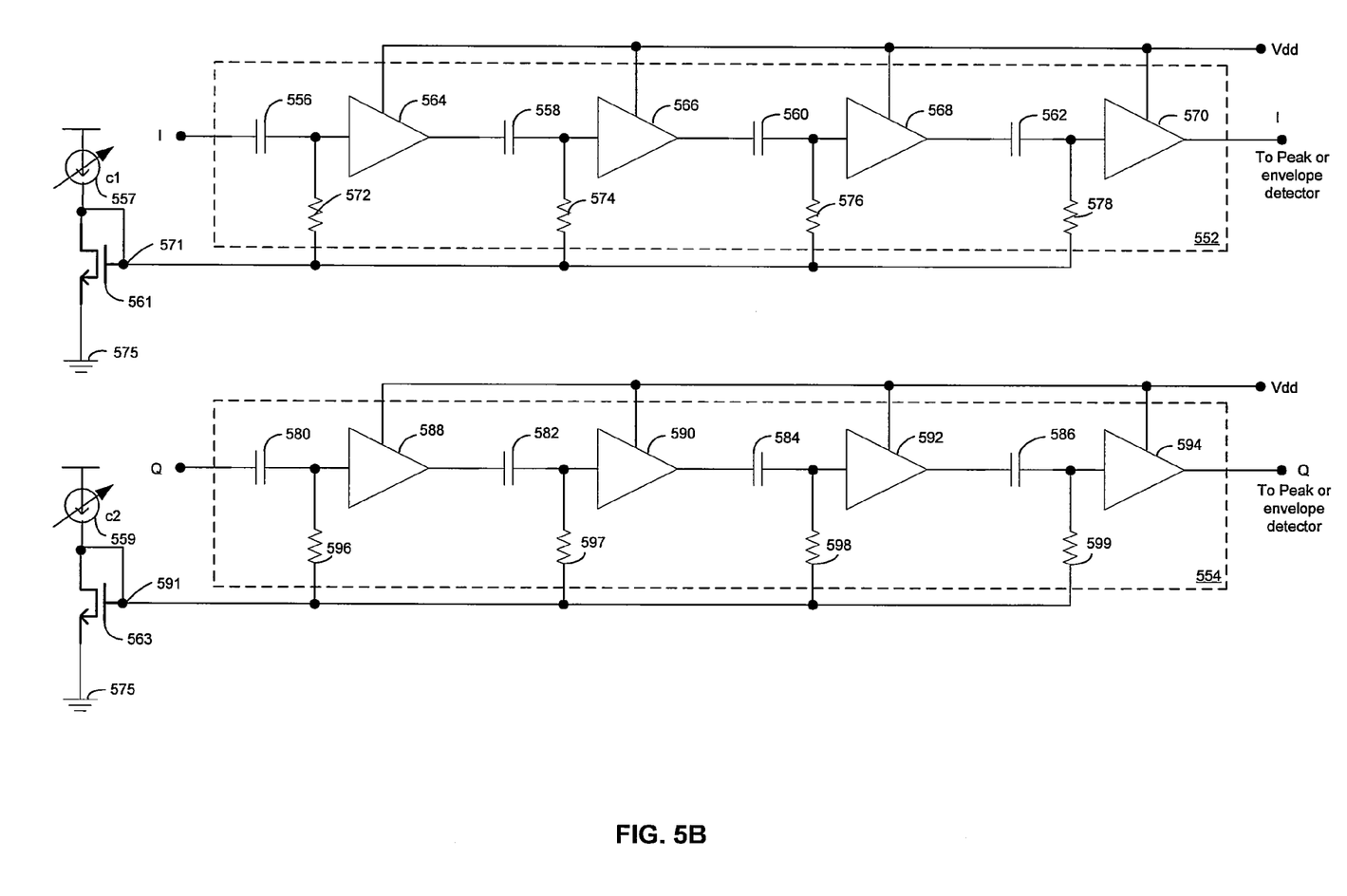
FIG. 5B is a block diagram of an exemplary portion of a programmable buffer for individual I and Q loop amplitude control for quadrature generators, in accordance with an embodiment of the invention.

FIG. 5B is a block diagram of an exemplary portion of a programmable buffer for individual I and Q loop amplitude control for quadrature generators, in accordance with an embodiment of the invention. Referring to FIG. 5B, there is shown a composite programmable buffer for the I component 552, a composite programmable buffer for the Q component 554, a plurality of programmable current sources Idac 557 and Idac 559, a plurality of transistors 561 and 563, and a ground (GND) 575. The composite programmable buffer for the I component 552 may comprise a plurality of capacitors 556, 558, 560, and 562, a plurality of programmable buffers 564, 566, 568, and 570, and a plurality of resistors 572, 574, 576, and 578. The composite programmable buffer for the Q component 554 may comprise a plurality of capacitors 580, 582, 584, and 586, a plurality of programmable buffers 588, 590, 592, and 594, and a plurality of resistors 596, 597, 598, and 599.

The composite programmable buffer for the I component 552 may receive an I component from the RC circuit 102. The plurality of programmable buffers 564, 566, 568, and 570 may receive a supply voltage Vdd. The state machine 516 may generate a digital control signal 513 to the programmable current source Idac 506 to adjust the biasing current in one or more of the programmable buffers 564, 566, 568, and 570. The state machine 516 may be enabled to communicate the digital control signal 513 to the current source Idac 506 one bit at a time, for example. In accordance with an embodiment of the invention, one bit may be allocated to control the biasing current of each programmable buffer within the composite programmable buffer for the I component 552. For example, the state machine 516 may output bit c1 to enable the programmable current source Idac 557 to output a particular biasing current to the programmable buffer for the I component 552. The biasing current generated by the programmable current source Idac 557 based on the received bit c1 may generate a different voltage level at node 571 and correspondingly adjust an amplitude level of the I component.

The composite programmable buffer for the Q component 554 may receive a Q component from the RC circuit 102. The plurality of programmable buffers 588, 590, 592, and 594 may receive a supply voltage Vdd. The state machine 516 may generate a digital control signal 513 to the programmable current source Idac 506 to adjust the biasing current in one or more of the programmable buffers 588, 590, 592, and 594. The state machine 516 may be enabled to communicate the digital control signal 513 to the current source Idac 506 one bit at a time, for example.

In accordance with an embodiment of the invention, one bit may be allocated to control the biasing current of each programmable buffer within the composite programmable buffer for the Q component 554. For example, the state machine 516 may output bit c2 to enable the programmable current source Idac 559 to output a particular biasing current to the programmable buffer for the Q component 554. The biasing current generated by the programmable current source Idac 559 based on the received bit c2 may generate a different voltage level at node 591 and correspondingly adjust the amplitude level of the Q component. In accordance with an embodiment of the invention, the amplitude of the I and Q components may be adjusted individually to reduce the amplitude mismatch between the I and Q components.

Figure 6:
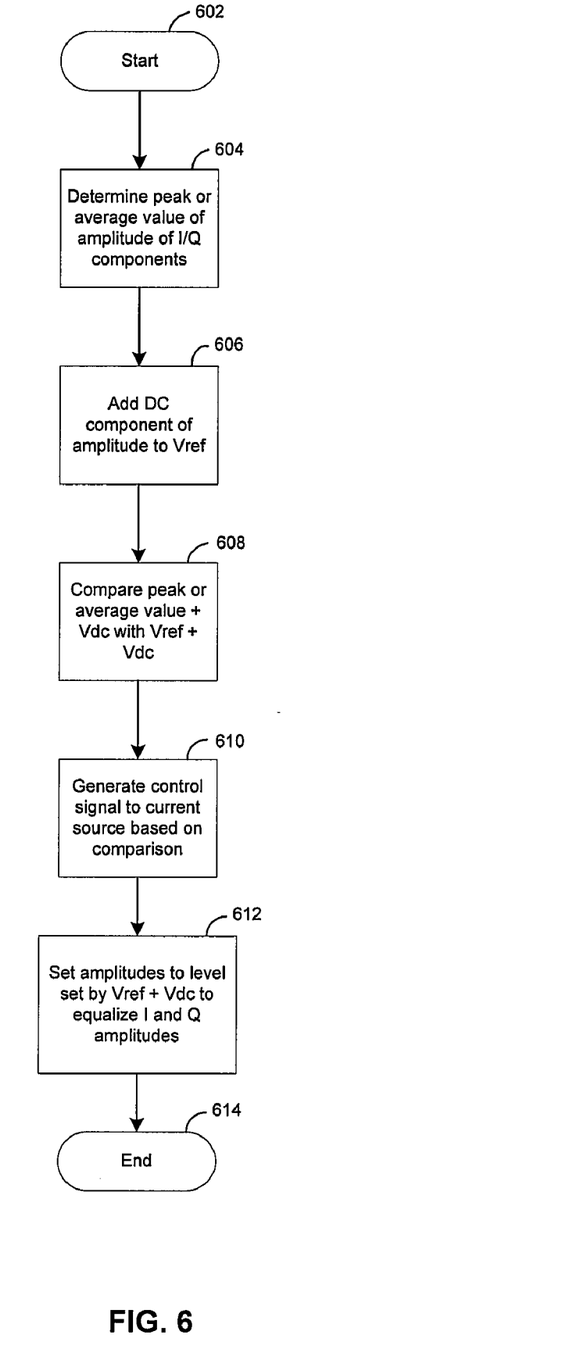
FIG. 6 is a flowchart illustrating exemplary steps for individual I and Q loop amplitude control for quadrature generators, in accordance with an embodiment of the invention.

FIG. 6 is a flowchart illustrating exemplary steps for individual I and Q loop amplitude control for quadrature generators, in accordance with an embodiment of the invention. Referring to FIG. 6, exemplary steps may begin at step 602. In step 604, the peak or envelope detector 508 may be enabled to determine the peak, rms, or average amplitude of the I component and/or the Q component and generate a corresponding analog voltage to the comparator 510. In step 606, the peak or envelope detector 508 may be enabled to generate a first input signal to the comparator 514 that may be equal to the sum of the DC component of the peak, rms, or average amplitude of the I component and/or the Q component and the peak, rms, or average amplitude of the I component and/or the Q component. The DC peak voltage of the I component and/or the Q component may be added to the reference voltage (VREF) and input to the comparator 514 as a second input signal.

In step 608, the comparator 514 may be enabled to compare the received first input signal and the second input signal. In step 610, the comparator 514 may be enabled to generate a digital signal to the state machine 516 based on the comparison. In step 612, the state machine 516 may be enabled to generate a digital control signal 513 to the programmable current source Idac 506 to adjust the biasing current in the programmable buffer 504. The biasing current of each programmable buffer may be adjusted dynamically to compensate for the amplitude mismatch between the I and Q components based on the digital control signal generated by the state machine 516.

In accordance with an embodiment of the invention, a method and system for individual I and Q loop amplitude control for quadrature generators may include a peak or envelope detector 508 that may be enabled to determine a peak, rms, or average amplitude voltage associated with an in-phase (I) component and/or a quadrature (Q) component of a generated signal. The determined amplitude voltage may be a peak, root mean square (rms) or the average voltage associated with the I component and the Q component. The DC peak or envelope detector 510 may be enabled to determine the DC reference voltage associated with an in-phase (I) component and/or a quadrature (Q) component of a generated signal. A reference voltage (VREF) may be determined based on the actual output voltage level of the I component and the Q component. The current source 518 and the variable resistor 520 may be enabled to generate a voltage drop based on the desired reference voltage (VREF). The reference voltage (VREF) may be generated according to the following equation:

$$VREF = (I*R) + PD\_DC$$

where PD_DC is the output of the op-amp 512 and may be equal to the DC reference voltage associated with the I component and/or the Q component, I is equal to the current generated by the current source 518, and R is equal to the resistance of the variable resistor 520.

The comparator 514 may be enabled to compare the sum of the determined peak, rms, or average amplitude voltage and the DC reference voltage with the determined reference voltage (VREF). The state machine 516 may be enabled to generate a digital control signal 513 based on the comparison. The amplitude mismatch between the I component and the Q component may be compensated by controlling a biasing current of one or more programmable buffers, for example, programmable buffer 564 associated with the I component and/or the programmable buffer 588 associated with the Q component based on the generated control signal.

The state machine 516 may be enabled to generate a digital control signal 513 to the programmable current source Idac 506. The programmable current source Idac 506 may be enabled to generate the biasing current to control one or more of the programmable buffers associated with the I component, for example, programmable buffer for the I component 552 and/or the programmable buffers associated with the Q component, for example, programmable buffer for the Q component 554. The state machine 516 may be enabled to individually control the biasing current of one or more programmable buffers associated with the I component, for example, programmable buffer for the I component 552 and/or the programmable buffers associated with the Q component, for example, programmable buffer for the Q component 554 by adjusting a value of one or more bits. The RC quadrature network 102 may be utilized to generate the I component and the Q component of the generated signal. The bias current of each programmable buffer may be adjusted dynamically to compensate for the amplitude mismatch between the I and Q components based on the digital control signal generated by the state machine 516.

Another embodiment of the invention may provide a machine-readable storage, having stored thereon, a computer program having at least one code section executable by a machine, thereby causing the machine to perform the steps as described above for independent I and Q loop amplitude control for quadrature generators.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   determining an amplitude voltage associated with an in-phase (I) component and a quadrature (Q) component of a generated signal;
   determining a DC reference voltage associated with said I component and said Q component; and
   compensating for an amplitude mismatch between said I component and said Q component by adjusting said amplitude voltage associated with one or both of said I component and said Q component, based on a comparison of said determined amplitude voltage and said determined DC reference voltage.

2. The method according to claim 1, comprising controlling a biasing current of one or more programmable buffers to adjust said amplitude voltage associated with one or both of said I component and said Q component.

3. The method according to claim 2, comprising generating a control signal based on said comparison.

4. The method according to claim 3, comprising controlling a programmable current source based on said generated control signal.

5. The method according to claim 4, comprising generating via said programmable current source, said biasing current, which is supplied to said one or more programmable buffers.

6. The method according to claim 2, comprising individually controlling said biasing current of said one or more programmable buffers by adjusting a value of one or more bits.

7. The method according to claim 1, comprising generating said I component and said Q component of said generated signal utilizing a quadrature network.

8. The method according to claim 7, wherein said quadrature network comprises a plurality of resistors and capacitors.

9. The method according to claim 1, wherein said determined amplitude voltage is one of: a peak amplitude voltage, a root mean square amplitude voltage, and an average amplitude voltage associated with said I component and said Q component of said generated signal.

10. A system for processing signals, the system comprising:
one or more circuits that enables determination of an amplitude voltage associated with an in-phase (I) component and a quadrature (Q) component of a generated signal;
said one or more circuits enables determination of a DC reference voltage associated with said I component and said Q component; and
said one or more circuits enables compensation for an amplitude mismatch between said I component and said Q component by adjusting said amplitude voltage associated with one or both of said I component and said Q component, based on a comparison of said determined amplitude voltage and said determined DC reference voltage.

11. The system according to claim 10, wherein said one or more circuits enables controlling of a biasing current of one or more programmable buffers to adjust said amplitude voltage associated with one or both of said I component and said Q component.

12. The system according to claim 11, wherein said one or more circuits enables generation of a control signal based on said comparison.

13. The system according to claim 12, wherein said one or more circuits enables controlling of a programmable current source based on said generated control signal.

14. The system according to claim 13, wherein said one or more circuits enables generation via said programmable current source, said biasing current, which is supplied to said one or more programmable buffers.

15. The system according to claim 11, wherein said one or more circuits enables individual control of said biasing current of said one or more programmable buffers by adjusting a value of one or more bits.

16. The system according to claim 10, wherein said one or more circuits enables generation of said I component and said Q component of said generated signal utilizing a quadrature network.

17. The system according to claim 16, wherein said quadrature network comprises a plurality of resistors and capacitors.

18. The system according to claim 10, wherein said determined amplitude voltage is one of: a peak amplitude voltage, a root mean square amplitude voltage, and an average amplitude voltage associated with said I component and said Q component of said generated signal.

19. A machine-readable storage having stored thereon, a computer program having at least one code section for processing signals, the at least one code section being executable by a machine for causing the machine to perform steps comprising:
determining an amplitude voltage associated with an in-phase (I) component and a quadrature (Q) component of a generated signal;
determining a DC reference voltage associated with said I component and said Q component; and
compensating for an amplitude mismatch between said I component and said Q component by adjusting said amplitude voltage associated with one or both of said I component and said Q component, based on a comparison of said determined amplitude voltage and said determined DC reference voltage.

20. The machine-readable storage according to claim 19, wherein said at least one code section comprises code for controlling a biasing current of one or more programmable buffers to adjust said amplitude voltage associated with one or both of said I component and said Q component.

21. The machine-readable storage according to claim 20, wherein said at least one code section comprises code for generating a control signal based on said comparison.

22. The machine-readable storage according to claim 21, wherein said at least one code section comprises code for controlling a programmable current source based on said generated control signal.

23. The machine-readable storage according to claim 22, wherein said at least one code section comprises code for generating via said programmable current source, said biasing current, which is supplied to said one or more programmable buffers.

24. The machine-readable storage according to claim 20, wherein said at least one code section comprises code for individually controlling said biasing current of said one or more programmable buffers by adjusting a value of one or more bits.

25. The machine-readable storage according to claim 19, wherein said at least one code section comprises code for generating said I component and said Q component of said generated signal utilizing a quadrature network.

26. The machine-readable storage according to claim 25, wherein said quadrature network comprises a plurality of resistors and capacitors.

27. The machine-readable storage according to claim 19, wherein said determined amplitude voltage is one of: a peak amplitude voltage, a root mean square amplitude voltage, and an average amplitude voltage associated with said I component and said Q component of said generated signal.

* * * * *